United States Patent [19]

Inoue

[11] Patent Number: 5,760,721
[45] Date of Patent: Jun. 2, 1998

[54] ANALOG-TO-DIGITAL CONVERSION DEVICE

[75] Inventor: Hideo Inoue, Hyogo, Japan

[73] Assignees: Mitsubishi Electric Semiconductor Software Co., Ltd., Hyogo; Mitsubishi Denki Kabushiki Kaisha, Tokyo, both of Japan

[21] Appl. No.: 731,312

[22] Filed: Oct. 15, 1996

[30] Foreign Application Priority Data

May 8, 1996 [JP] Japan ................... 8-113852

[51] Int. Cl.$^6$ ........................................... H03M 1/00
[52] U.S. Cl. ..................... 341/141; 341/155; 341/122
[58] Field of Search ........................ 341/122, 141, 341/155

[56] References Cited

U.S. PATENT DOCUMENTS

| | | | |
|---|---|---|---|
| 5,172,116 | 12/1992 | Noma | 341/141 |
| 5,291,197 | 3/1994 | Abe | 341/141 |
| 5,293,167 | 3/1994 | Campbell, Jr. et al. | 341/141 |
| 5,331,324 | 7/1994 | Nakajima | |
| 5,617,090 | 4/1997 | Ma et al. | 341/141 |
| 5,619,201 | 4/1997 | Imakura | 341/141 |

FOREIGN PATENT DOCUMENTS

| | | |
|---|---|---|
| 1147618 | 6/1989 | Japan |
| 5315957 | 11/1993 | Japan |

OTHER PUBLICATIONS

M37782 Group & M37783 Group "User's Manual" for One Chip Microcomputer of Mitsubishi Electric Corporation, Dec., 1993.

*Primary Examiner*—Jeffrey A. Gaffin
*Assistant Examiner*—Jason L. W. Kost
*Attorney, Agent, or Firm*—Leydig, Voit & Mayer, Ltd.

[57] ABSTRACT

An analog-to-digital (A-D) conversion device includes a channel selector for selecting a plurality of analog signal input terminals. The analog-to-digital converter converts an analog signal selected and supplied by the channel selector into a digital signal. A control device controls the channel selector to operate in either a scan mode in response to a starting trigger for scan conversion or a single mode in response to receiving a starting trigger for single conversion.

14 Claims, 14 Drawing Sheets

SCAN MODE REGISTER 0

| b | BIT | FUNCTION | INITIAL | R | W |
|---|---|---|---|---|---|
| 0 | RESERVED | | ? | 0 | × |
| 1 | SCAN MODE SELECT BIT | 0: ONE-SHOT MODE<br>1: SEQUENTIAL MODE | 0 | ○ | ○ |
| 2 | H/W TRIGGER SELECT BIT | 0: EXTERNAL TRIGGER<br>1: OUTPUT BUS | 0 | ○ | ○ |
| 3 | A-D CONVERSION START TRIGGER SELECT BIT | 0: S/W<br>1: H/W | 0 | ○ | ○ |
| 4 | INTERRUPT/DMA SELECT BIT | 0: INTERRUPT REQUEST<br>1: DMA REQUEST | 0 | ○ | ○ |
| 5 | A-D CONVERSION END FLAG | 0: IN A-D CONVERSION<br>1: END OF A-D CONVERSION | 1 | ○ | × |
| 6 | A-D CONVERSION STOP BIT | 0: NO OPERATION<br>1: STOP A-D CONVERSION | 0 | 0 | ○ |
| 7 | A-D CONVERSION START BIT | 0: NO OPERATION<br>1: START A-D CONVERSION | 0 | 0 | ○ |

○: ENABLE
×: DISABLE

FIG. 8 (B)

SCAN MODE REGISTER 1

| b | BIT | FUNCTION | INITIAL | R | W |
|---|---|---|---|---|---|
| 8 | RESERVED | | ? | 0 | × |
| 9 | A-D CONVERSION SPEED SELECT BIT | 0: NORMAL MODE<br>1: LOW SPEED MODE | 0 | 0 | 0 |
| 10 | RESERVED | | ? | 0 | × |
| 11 | RESERVED | | ? | 0 | × |
| 12 | SCAN LOOP SELECT BIT (A-D CONVERSION CHANNEL ON READING) | ON WRITING<br>b12 b13 b14 b15<br>0  1  × ×  4-CHANNEL SCAN<br>1  0  × ×  8-CHANNEL SCAN<br>0  0  × × ⎤<br>1  1  × × ⎦ 16-CHANNEL SCAN<br>ON READING<br>b12 b13 b14 b15<br>0  0  0  0 : A-D CONVERSION IN AN0<br>0  0  0  1 : A-D CONVERSION IN AN1<br>0  0  1  0 : A-D CONVERSION IN AN2<br>0  0  1  1 : A-D CONVERSION IN AN3<br>0  1  0  0 : A-D CONVERSION IN AN4<br>0  1  0  1 : A-D CONVERSION IN AN5<br>0  1  1  0 : A-D CONVERSION IN AN6<br>0  1  1  1 : A-D CONVERSION IN AN7<br>1  0  0  0 : A-D CONVERSION IN AN8<br>1  0  0  1 : A-D CONVERSION IN AN9<br>1  0  1  0 : A-D CONVERSION IN AN10<br>1  0  1  1 : A-D CONVERSION IN AN11<br>1  1  0  0 : A-D CONVERSION IN AN12<br>1  1  0  1 : A-D CONVERSION IN AN13<br>1  1  1  0 : A-D CONVERSION IN AN14<br>1  1  1  1 : A-D CONVERSION IN AN15 | 0 | 0 | 0 |
| 13 | | | 0 | 0 | 0 |
| 14 | | | 0 | 0 | × |
| 15 | | | 0 | 0 | × |

SINGLE MODE REGISTER 1

| b | BIT | FUNCTION | INITIAL | R | W |
|---|---|---|---|---|---|
| 8 | A-D CONVERSION MODE SELECT BIT | 0: A-D CONVERSION MODE<br>1: COMPARISON MODE | 0 | ○ | ○ |
| 9 | A-D CONVERSION SPEED SELECT BIT | 0: NORMAL MODE<br>1: LOW SPEED MODE | 0 | ○ | ○ |
| 10 | EXTENDED CHNNEL SELECT BIT | 0: SELECT INTERNAL CHANNEL<br>1: SELECT EXTENDED CHANNEL | 0 | ○ | ○ |
| 11 | RESERVED | | 0 | ○ | ○ |
| 12 | ANALOG INPUT TERMINAL SELECT BIT | b4 b5 b6 b7<br>0 0 0 0 : SELECT AN0<br>0 0 0 1 : SELECT AN1<br>0 0 1 0 : SELECT AN2<br>0 0 1 1 : SELECT AN3<br>0 1 0 0 : SELECT AN4<br>0 1 0 1 : SELECT AN5<br>0 1 1 0 : SELECT AN6<br>0 1 1 1 : SELECT AN7<br>1 0 0 0 : SELECT AN8<br>1 0 0 1 : SELECT AN9<br>1 0 1 0 : SELECT AN10<br>1 0 1 1 : SELECT AN11<br>1 1 0 0 : SELECT AN12<br>1 1 0 1 : SELECT AN13<br>1 1 1 0 : SELECT AN14<br>1 1 1 1 : SELEST AN15 | 0 | ○ | ○ |
| 13 | | | 0 | ○ | ○ |
| 14 | | | 0 | ○ | ○ |
| 15 | | | 0 | ○ | ○ |

ANALOG-TO-DIGITAL CONVERSION DEVICE

BACKGROUND OF THE INVENTION

1. Field of the Invention

This invention relates to an A-D conversion device for selecting an analog signal input terminal periodically and non-periodically from a plurality of analog signal input terminals into which an analog signal is input, to convert an analog signal into a digital signal by an A-D converter of one system.

2. Description of the Prior Art

Figure 11:
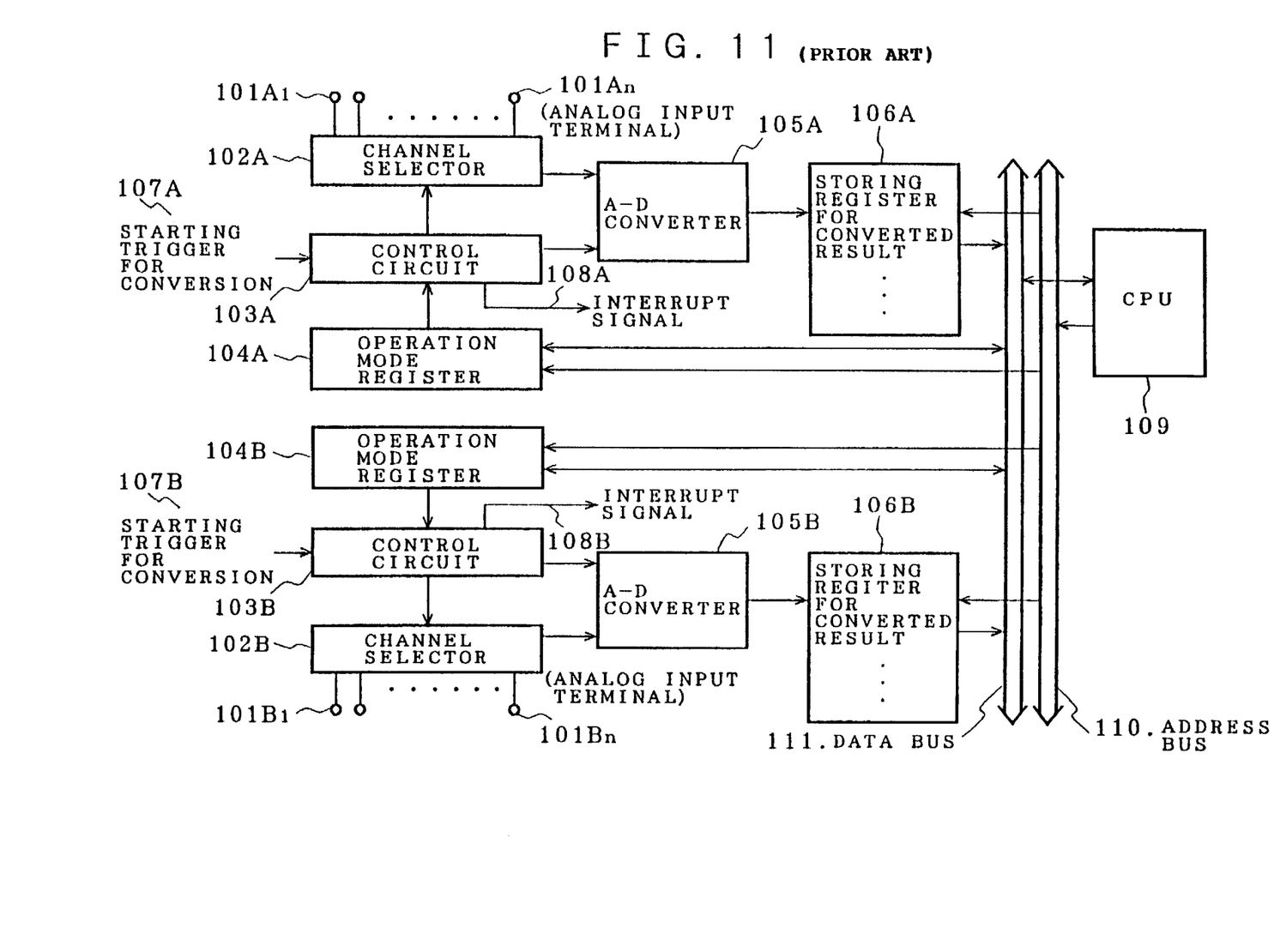
FIG. 11 is a block diagram showing a conventional A-D conversion device.

FIG. 11 is a block diagram showing the construction of a conventional A-D conversion device. In FIG. 11, reference numerals $101A_1$ to $101A_n$, and $101B_1$ to $101B_n$ designate a plurality of analog input terminals into which an analog signal is input; 102A, 102B, channel selectors for selecting one out of a plurality of input channels; 103A, 103B, control circuits for controlling a channel selector and an A-D operation; 104A, 104B, operation mode registers for setting modes of A-D converters 105A, 105B on the basis of an instruction signal which is input through an address bus 110 and a data bus 111 from a CPU 109; and 106A, 106B, storing registers for converted result for storing the converted result of the A-D converters 105A, 105B. To the operation mode registers 104A, 104B can be set, in addition to selection of starting trigger for conversion, selection of operation speed, control bits of generation of interrupt signals 108A, 108B, mode selection of scan mode, selection of input channel for entering an analog signal, and the like.

The operation will be described hereinafter. The control circuits 103A, 103B select, when A-D conversion is started, starting using the starting triggers for conversion 107A, 107B sent from the external, or using a software starting by way of a bit set stored in the operation mode registers. The control circuits 103A, 103B control the channel selectors 102A, 102B to sequentially input analog signals into the plurality of analog input terminals $101A_1$ to $101A_n$, and $101B_1$ to $101B_n$, into the A-D converters 105A, 105B for A-D conversion, and store the converted results in the storing registers for converted result 106A, 106B.

Figure 12:
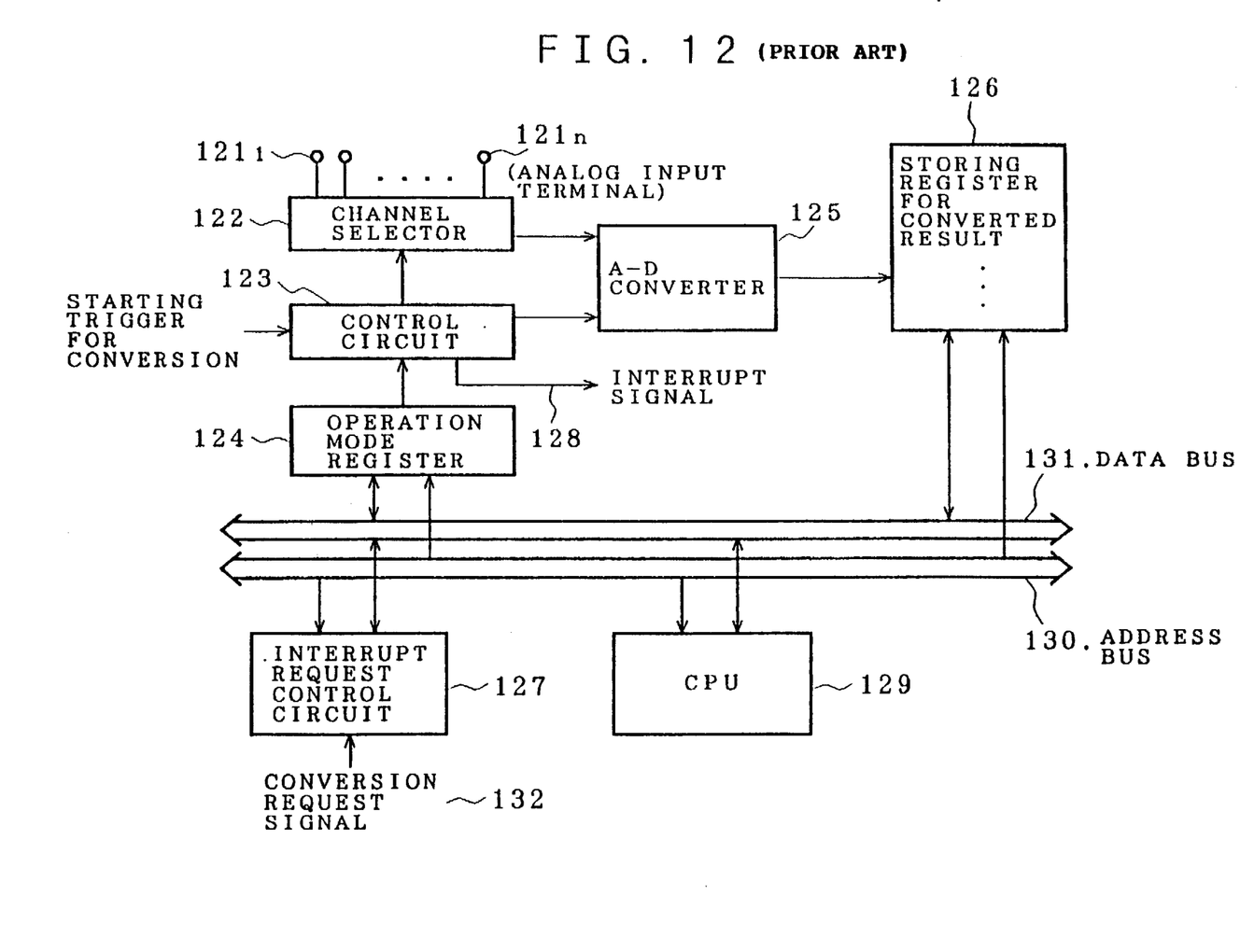
FIG. 12 is a block diagram showing a conventional further A-D conversion device.

FIG. 12 is a block diagram showing the construction of another conventional A-D conversion device. In FIG. 12, reference numerals $121_1$ to $121_n$ designate a plurality of analog input terminals into which an analog signal is input; 122, a channel selector for selecting one out of a plurality of analog input terminals; 123, a control circuit for controlling a channel selector and an A-D operation; 124, an operation mode register for setting a mode of an A-D converter 125 on the basis of an instruction signal which is input through an address bus 130 and a data bus 131 from a CPU 129; 126, a storing register for converted result for storing the converted result of the A-D converters 125; 127, an interrupt request control circuit; and 132, a conversion request signal.

The operation will be described hereinafter.

The control circuit 123 controls the channel selector 122 to sequentially analog signals input in the plurality of analog input terminals $121_1$ to $121_n$ into the A-D converter 125 for A-D conversion in a continuous scan mode, and stores the converted result in the storing register 126. During the continuous scan mode operation, an asynchronous conversion request signal 132 is input into the interrupt request control circuit 127, a control signal is transmitted from the interrupt request control circuit 127 to the CPU 129 through the address bus 130 and the data bus 131. Subsequently, the CPU 129 first stops the A-D converter 125 being operated in a continuous scan mode on the basis of the operation of a software read from a memory (not shown), and resets a scan mode set in the operation mode register to a single mode to execute re-starting. Prior art relating to the above-described conventional embodiments, includes, for example, JP-A 5/315957 and JP-A 1/147618.

The conventional A-D conversion device is constructed as described above. Therefore, in the device in which two systems of A-D converter modules of a scan mode and a single mode are separately and independently provided as shown in FIG. 11, the respective A-D converters can be operated individually, and periodic conversion and non-periodic conversion can be simultaneously realized. On the other hand, in a layout of IC chip, two sets of analog portions and storing register portions for converted result which occupy a major portion are provided, thus posing a problem in that the chip area is enlarged.

Further, in the device for selecting A-D conversion in a scan mode and A-D conversion in a single mode by software with respect to one system of A-D converter, as in the conventional A-D conversion device shown in FIG. 12, it is not possible to obtain the converted result with respect to A-D conversion in a single mode in real time, posing a problem in that a heavy burden is imposed by the software.

SUMMARY OF THE INVENTION

This invention solves the problems noted above with respect to the conventional D/A conversion device. An object of the present invention is to provide an A-D conversion device which can execute shifting from A-D conversion operation having a priority to A-D conversion operation having a suitable priority without intervention of a CPU, can carry out operation every factor of interruption, can individually set a single mode and a scan mode, and can finely set a priority order of A-D conversion operation.

The A-D converter according to the preferred mode of the present invention comprises a channel selector for selecting a plurality of analog signal input terminals, an A-D converter for converting an analog signal selected and supplied by said channel selector into a digital signal, and control means for controlling the channel selector to preferentially operate either a scan mode at the time of receiving starting trigger for scan conversion or a single mode at the time of receiving starting trigger for single conversion relative to the other.

Further, in the A-D converter according to the other preferred mode of the present invention, the control means comprises a single conversion executing flag for storing a set value for carrying out a conversion operation upon receipt of a starting trigger for single conversion having a higher priority, a scan conversion executing flag for storing a set value for carrying out a conversion operation upon receipt of a starting trigger for scan conversion having a lower priority, and operation selecting means for stopping an operation on the basis of a value stored in the scan conversion executing flag by an operation signal from the single conversion executing flag.

Furthermore, in the A-D converter according to another preferred mode of the present invention, there are provided a scan conversion waiting flag for, when a conversion starting signal having a lower priority is input during the conversion operation of a higher priority, carrying out setting for temporarily waiting an conversion operation of a lower priority, and waiting control means for controlling the scan conversion waiting flag.

Further, in the A-D converter according to still another preferred mode of the present invention, there is provided a control device having an interrupt control circuit for generating interrupt signals individually and independently when the conversion operation of a higher priority is terminated and when the conversion operation of a lower priority is carried out.

Further, in the A-D converter according to the another preferred mode of the present invention, there are individually and independently provided a single operation mode register for setting an operation mode at the time of conversion of a single mode and a scan mode register for setting an operation mode at the time of conversion of a scan mode.

Further, in the A-D converter of this invention in the another preferred mode of the present invention, there is provided an operation mode register having a priority channel for applying a priority order every channel.

DETAILED DESCRIPTION OF THE PREFERRED EMBODIMENTS

The embodiments of the present invention will be described hereinafter with reference to the accompanying drawings.

Embodiment 1

Figure 1:
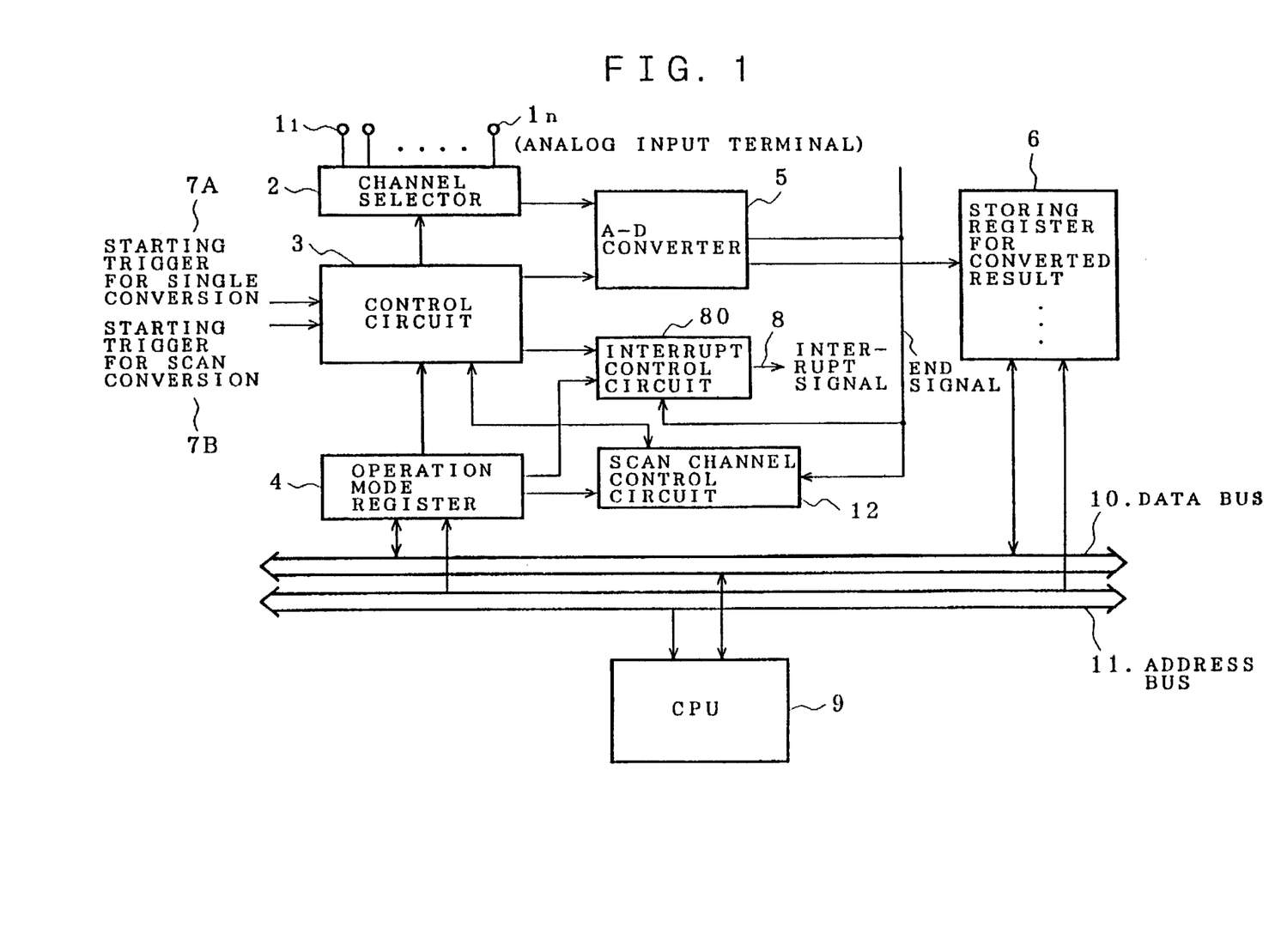
FIG. 1 is a block diagram showing an A-D conversion device according to an embodiment 1 of the present invention.

FIG. 1 is a block diagram showing an A-D conversion device according to an embodiment 1 of the present invention. In FIG. 1, reference numerals $1_1$ to $1_n$ designate a plurality of analog signal input terminals; 2, a channel selector for sequentially selecting the analog signal input terminals $1_1$ to $1_n$; 3, a control circuit (control means) for controlling the channel selector 2; 4, an operation mode register connected to a data bus 10 and an address bus 11 to supply an operation mode signal to the control circuit 3; 5, an A-D converter for converting an analog signal selected and supplied by the channel selector 2 into a digital signal on the basis of a control signal from the control circuit 3; 6, a storing register for converted result for storing the converted result of the A-D converter 5; 9, a CPU connected to the data bus 10 and the address bus 11; 12, a scan channel control circuit for performing switching of channels and loop setting of a scan in a scan mode; and 80, an interrupt control circuit for generating an interrupt signal 8 upon receipt of an end signal of A-D conversion.

Figure 2:
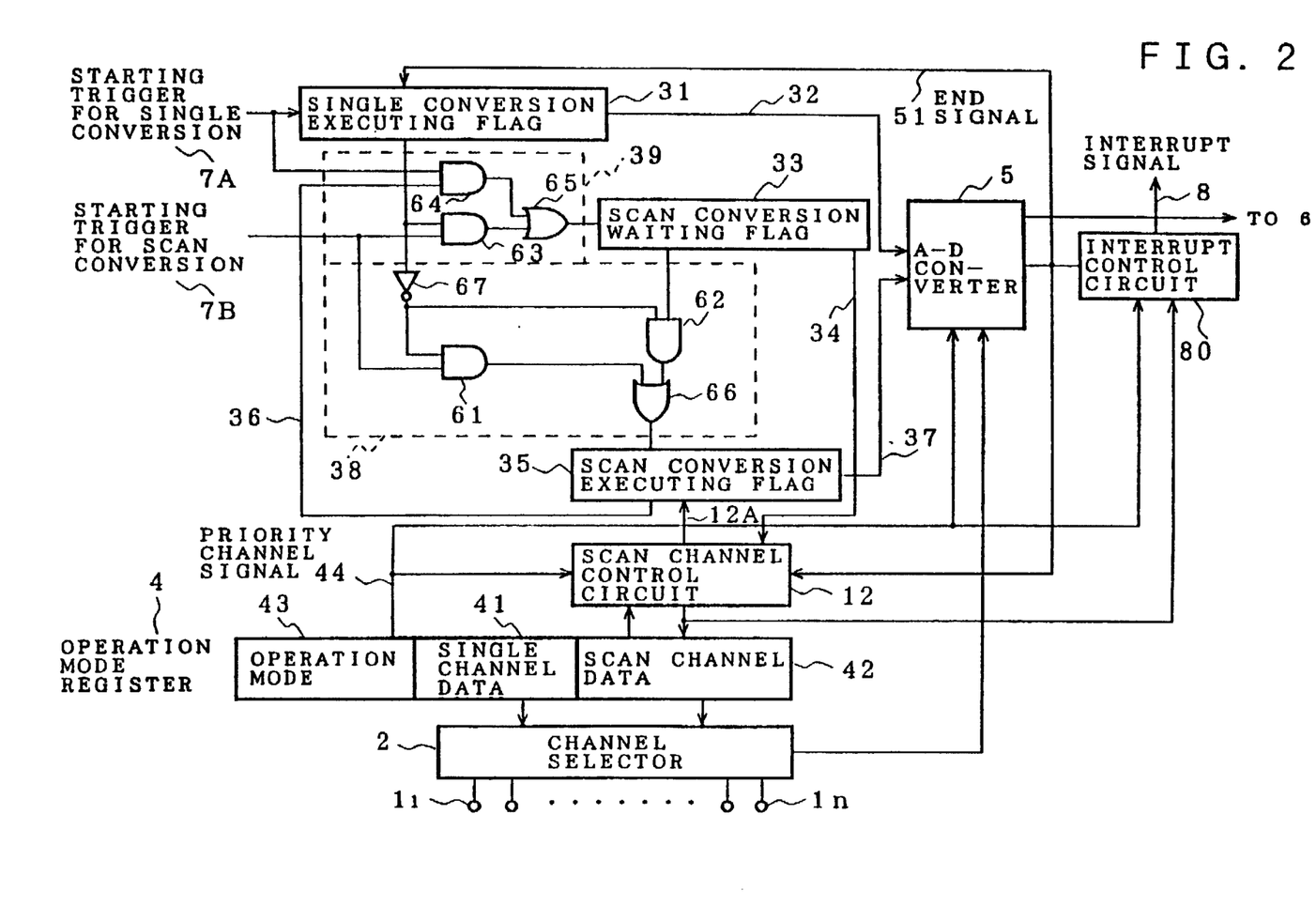
FIG. 2 is a block diagram showing one embodiment of a control circuit in the A-D conversion device according to an embodiment 1 shown in FIG. 1.

FIG. 2 is a block diagram showing one constitution of the control circuit 3. In FIG. 2, reference numeral 31 designates a single conversion executing flag for carrying out a conversion operation upon receipt of a starting trigger signal 7A for single conversion of a higher priority to supply an output signal 32 to the A-D converter 5; 33, a scan conversion waiting flag for temporarily waiting the execution of A-D conversion under a scan mode of a lower priority when a conversion starting signal in a single mode of a higher priority is input to the control circuit 3 during the operation of A-D conversion under a scan mode of a lower priority; 35, a scan conversion executing flag for carrying out a conversion operation upon receipt of a conversion starting signal in a scan mode of a lower priority; and 38, operation selecting means for stopping the operation of the scan conversion executing flag 35 by an operation signal transmitted from the single conversion executing flag 31. The operation selecting means 38 comprises AND circuits (first AND circuits) 61, 62, an OR circuit 66, and an inverter circuit (a first inverter circuit) 67. Reference numeral 39 designates a waiting control circuit for operating the scan conversion waiting flag 33, which comprises AND circuits 63, 64 and an OR circuit 65.

It is possible to set mode conditions corresponding to a scan mode (a periodic conversion mode) and a single mode (a non-periodic conversion mode) using the operation mode register 4 shown in FIGS. 1 and 2. For example, in the scan mode, they are set such that the A-D conversion is activated by software, an operating speed of the A-D conversion is double speed, and an interrupt is generated at the end of scanning for one period of a 4-channel scan mode. In the single mode, they are set such that the A-D conversion is activated by a starting trigger for single conversion, an operation speed of the A-D conversion is normal, a channel CH5 is selected as the analog input terminal, and DAM process is started at the end of the conversion.

The operation will be described hereinafter.

First, if the starting trigger 7A for single conversion is input to the control circuit 3 during the stoppage of the A-D conversion device 5, a value of the single conversion executing flag 31 is set to 1, and the conversion operation in a single mode is started. After the end of the A-D conversion, the value of the single conversion executing flag 31 is cleared to 0 by an end signal 51.

Figure 3:
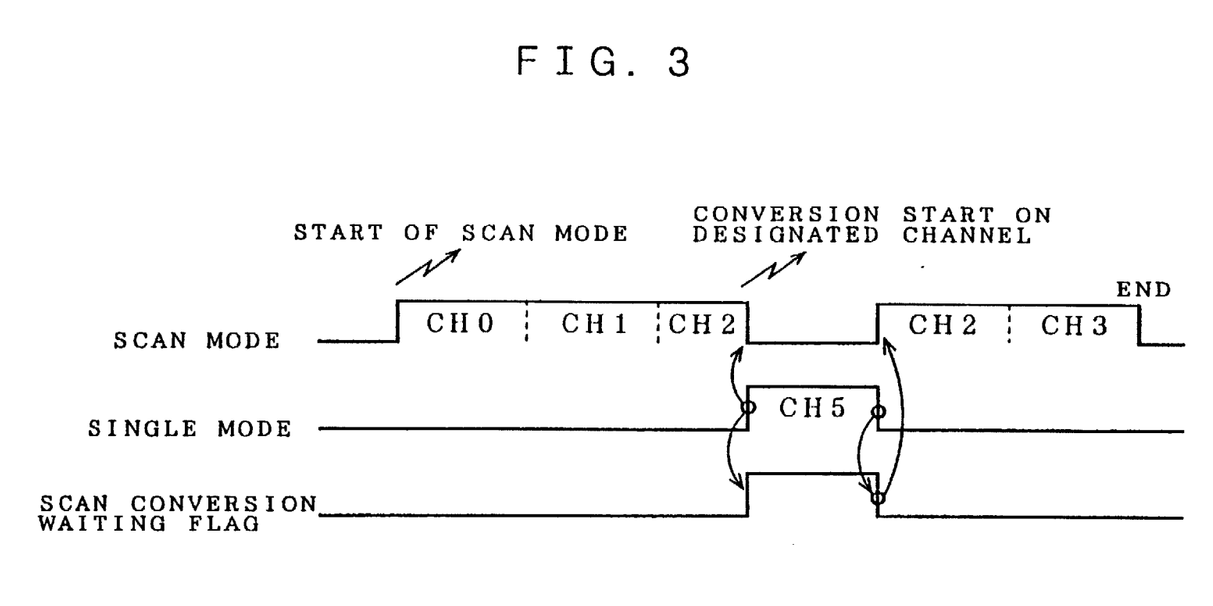
FIG. 3 is a timing chart explaining the operation of the A-D conversion device according to an embodiment 1.
Figure 4:
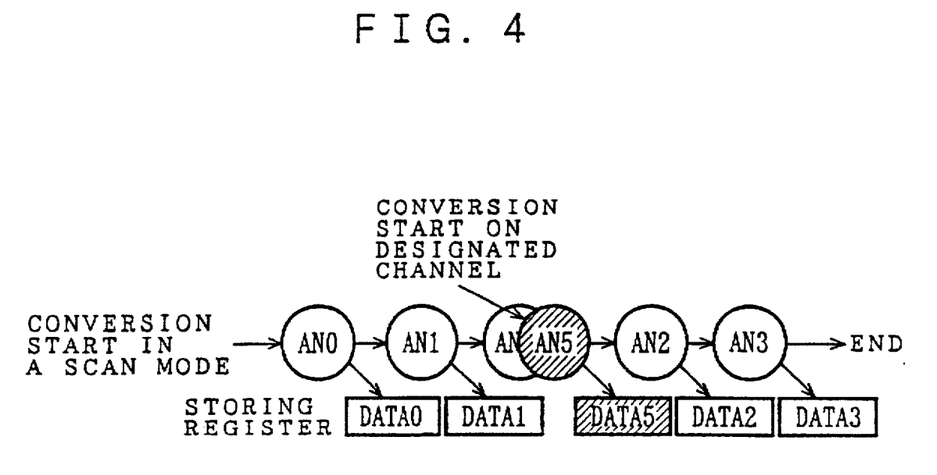
FIG. 4 shows an A-D conversion state of the A-D conversion device according to an embodiment 1.

If the starting trigger 7B for scan conversion is input to the control circuit 3 during the stoppage of the A-D conversion device 55, an output from the inverter circuit 67 is output such that an at the AND circuit 61 is 1. The output "1" of the AND circuit 61 is input in the OR circuit 66, and after this, the value of the scan conversion executing flag is set to 1, whereby as shown in FIGS. 3 and 4, the conversion operation in a scan mode is started sequentially from a channel CH0. At this time, the value of the scan conversion executing flag is "1", and the values of the single conversion executing flag and the scan conversion waiting flag are "0".

In the case where the starting trigger 7A for single conversion is input to the control device 3 during the conversion operation of the channel CH2 in the scan mode, the output of the AND circuit 64 is "1" by the output from the trigger and the scan conversion executing flag 35, the output of the AND circuit 64 sets the scan conversion waiting flag 33 to "1" through the OR circuit 65, and information that the channel being converted is CH2 is preserved in a scan channel data area 42 within the operation mode register 4.

On the other hand, since the output of the inverter circuit 67 is "0" by the input of the starting trigger 7A for single conversion to the control circuit 3 the output of the AND circuit 61 is "0", and the output of the scan conversion executing flag 35 is "0". At the same time, the value of the single conversion executing flag 31 is set to 1, and the conversion operation in a single mode is started. When the conversion in a single mode ends, the content of the scan conversion waiting flag is transferred to the scan conversion executing flag 35 through the AND circuit 62 and the OR circuit 66, and the conversion from the channel CH2 is again started in a scan mode as shown in FIGS. 3 and 4.

During the operation described above, the scan channel control circuit 12 rewrites the content of the scan channel data depending on the content of the operation mode and the end signal of the A-D conversion operation. During the normal scanning operation, the channel is incremented every time the end signal 51 is input to generate an interrupt after the end of one period, and a signal is transmitted to the interrupt control circuit 80. In the case where the mode for stopping the A-D conversion operation by scanning for one period is selected by the operation mode, the value of the scan conversion executing flag 37 is cleared by the control signal 12A. In the case where the single mode is started during scanning, the content of the scan channel data is held by the signal 34 from the scan conversion waiting flag 33. As described above, according to the A-D conversion device of the embodiment 1, when a starting signal of the A-D conversion operation in a single mode of a higher priority is input at the time of the A-D conversion operation in a scan mode of a lower priority, the A-D conversion operation in a single mode of a higher priority is automatically switched and started in real time, without intervention of the CPU, by the switching operation of the hardware circuit composed of the inverter circuit 67, the AND circuits 61, 62, 63, and 64, and the OR circuits 65 and 66. Accordingly, the processing ability of CPU can be improved, and since the switching starting operation is carried out by the hardware circuit, no burden is imposed on the software.

Embodiment 2

Figure 5:
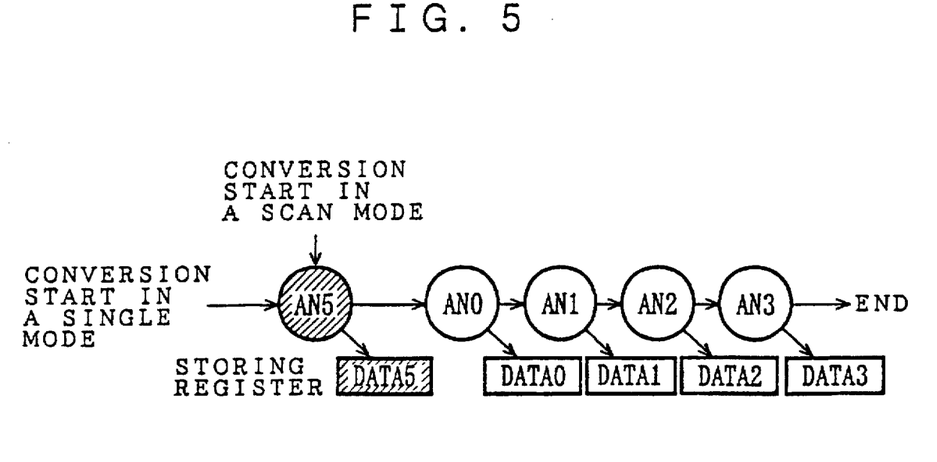
FIG. 5 shows a conversion state in the A-D conversion of the A-D conversion device according to an embodiment 2.

In the A-D conversion device according to the above-described embodiment 1, an example has been described in which during the A-D conversion in a scan mode of a lower priority, the conversion in a single mode of a higher priority is interrupted. Conversely, in the case where during the conversion operation of CH5 under a single mode of a higher priority, the starting trigger 7B for scan conversion in a scan mode of a lower priority is input into the control circuit 3, the value "1" is set to the scan conversion waiting flag 33 by the AND circuit 63 and the OR circuit 65. Then, as shown in FIG. 5, the completion of the A-D conversion of CH5 under a single mode of a higher priority is waited, the value of the scan conversion waiting flag 33 is transferred to the scan conversion executing flag 35 through the AND circuit 62 and the OR circuit 66, and the conversion in a scan mode of a lower priority is automatically started.

As described above, according to the A-D conversion device of embodiment 2, when the conversion in a single mode of a higher priority is ended, without intervention of CPU, by the switching operation of the hardware circuit composed of the inverter circuit 67, the AND circuits 61, 62, 63, and 64, and the OR circuits (the second OR circuit) 65 and (the first OR circuit) 66, the conversion operation in a scan mode of a lower priority can be automatically started. Accordingly, the processing ability of CPU can be improved, and since the switching starting operation is carried out by the hardware circuit, no burden is imposed on the software.

Embodiment 3

Figure 6:
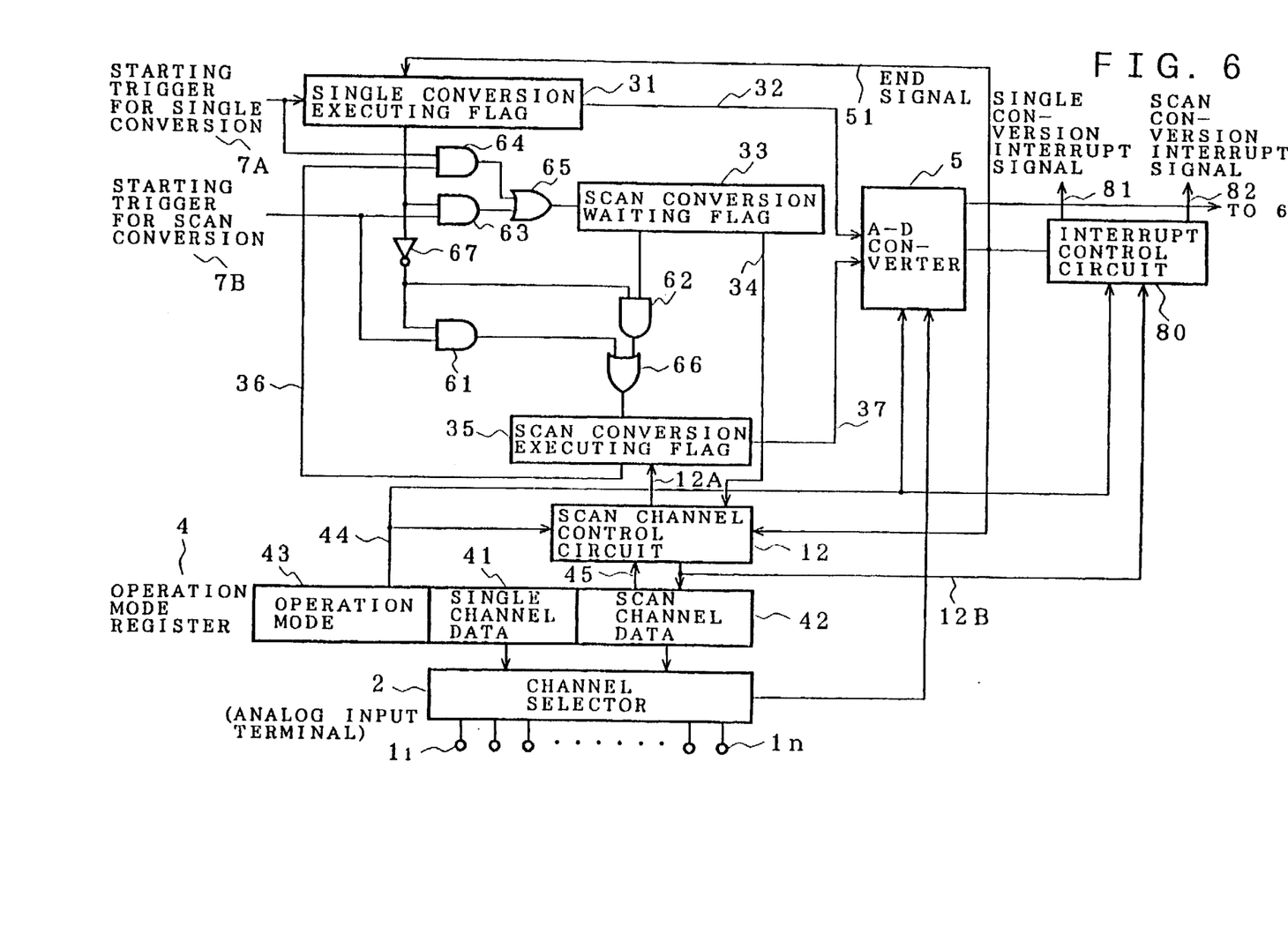
FIG. 6 is a block diagram of a control circuit in the A-D conversion device according to an embodiment 3.

In the A-D conversion device according to the above-described embodiment 1 shown in FIGS. 1 and 2, the number of systems for the interrupt signal 8 output after the end of the conversion operation is one. However, in the A-D conversion device according to the present embodiment 3, in addition to the embodiment of the control circuit 3 shown in FIG. 2, there is provided a further embodiment of an interrupt control circuit 80 provided with an output system in the form of two systems, as shown in FIG. 6. The same parts as those shown in FIG. 2 are indicated by the same reference numerals, and a duplicated description will be omitted.

The operation will be described hereinafter.

The interrupt control circuit 80 is provided to generate an interrupt after the end of the A-D conversion on the basis of the value set by the value of the operation mode 43 in the operation mode register 4. At the end of the single conversion operation, a single conversion interrupt signal 81 is output, and at the end of the scan conversion operation for one period in a scan mode, a scan conversion interrupt signal 82 is output. The judgement whether the scan conversion operation ends or not is made by the value of the control signal 12B output from the scan channel control circuit 12.

As described above, according to the A-D conversion device of embodiment 3, the single conversion interrupt signal 81 and the scan conversion interrupt signal 82 are separately output whereby the determination of a priority can be made by the interrupt signal. Thus, there is an effect in that the processing by interrupt factor can be performed by using two interrupt signals.

Embodiment 4

In the A-D conversion device according to the present embodiment 4, in addition to the embodiment of the A-D conversion device according to embodiment 1 shown in FIGS. 1 and 2, a single operation mode register 4A for setting conditions of an operation mode at the time of a single mode conversion and a scan mode register 4B for setting an operation mode at the time of a scan mode conversion are separately provided. For example, the A-D conversion device has a hardware trigger selecting bit "2" in the embodiment of a scan mode register and a hardware trigger selecting bit "2" in the constitution of a single mode register shown in FIG. 8 as separate registers. The same parts as those shown in FIG. 2 are indicated by the same reference numerals, and a duplicated description will be omitted.

The operation will be described hereinafter.

Figure 7:
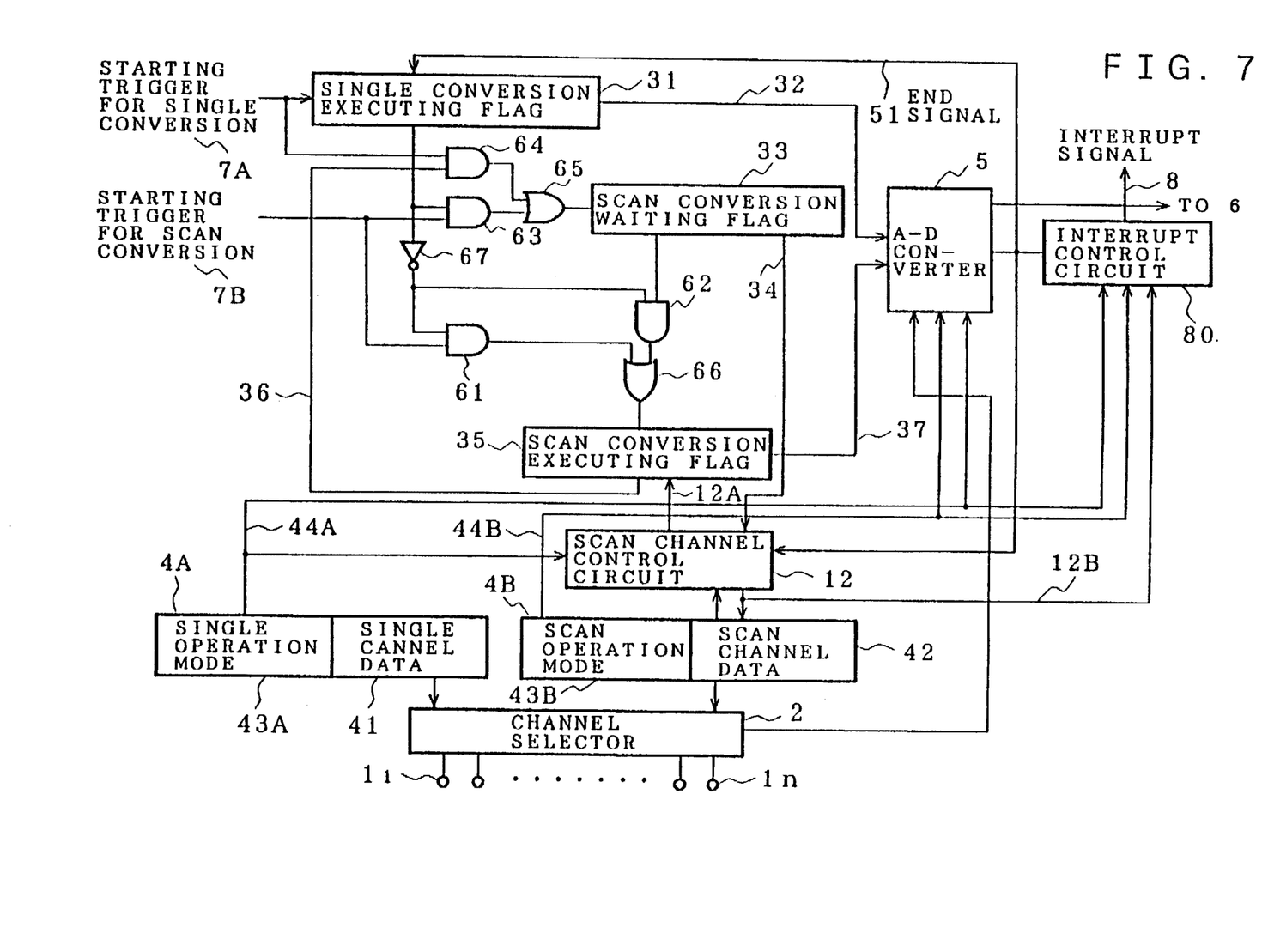
FIG. 7 is a block diagram of a control circuit in the A-D conversion device according to an embodiment 4.
Figure 8:
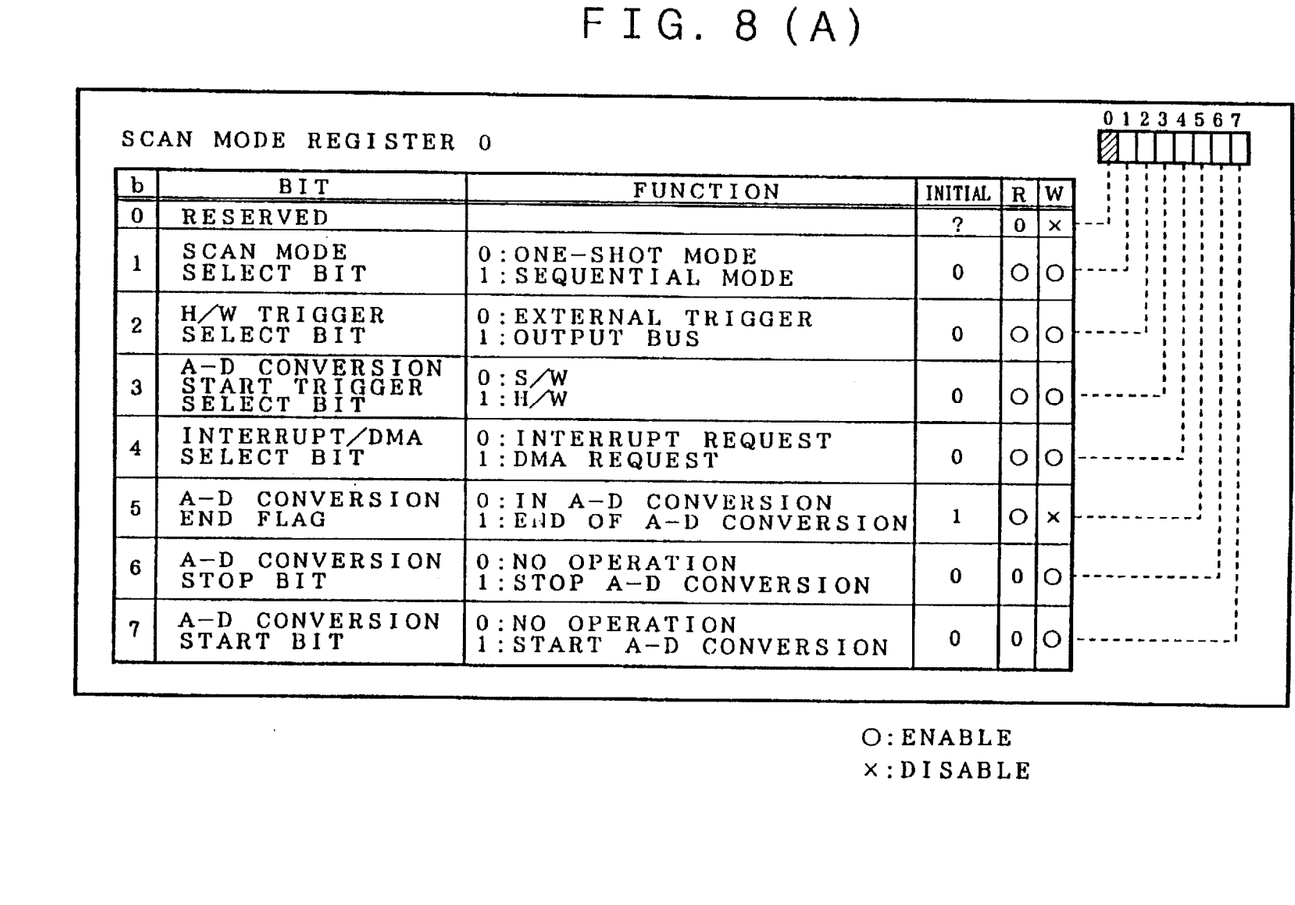
FIG. 8(a)–(d) are views of the scan mode and the single mode registers in the A-D conversion device according to an embodiment 4.
Figure 8B:
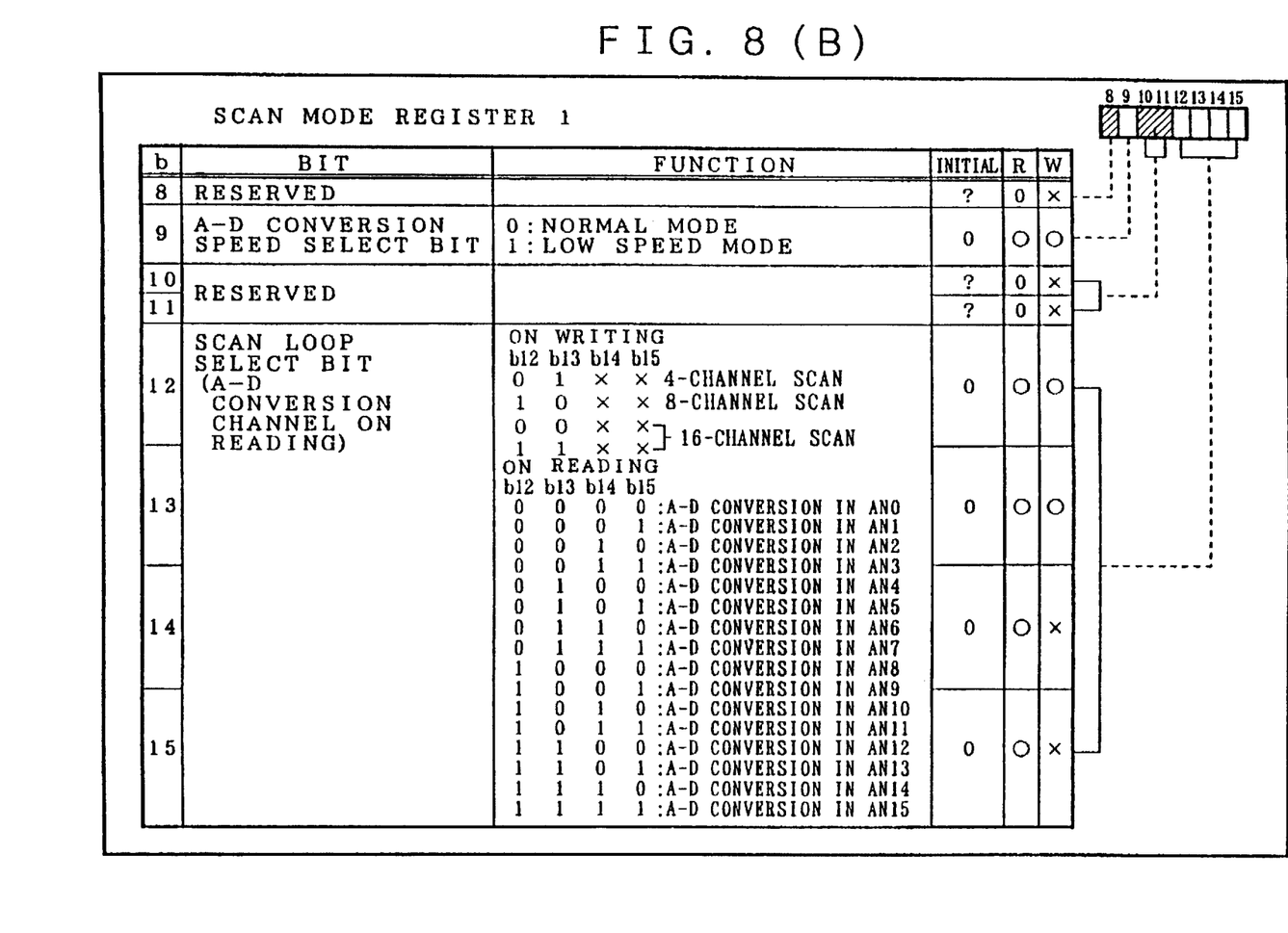
Figure 8C:
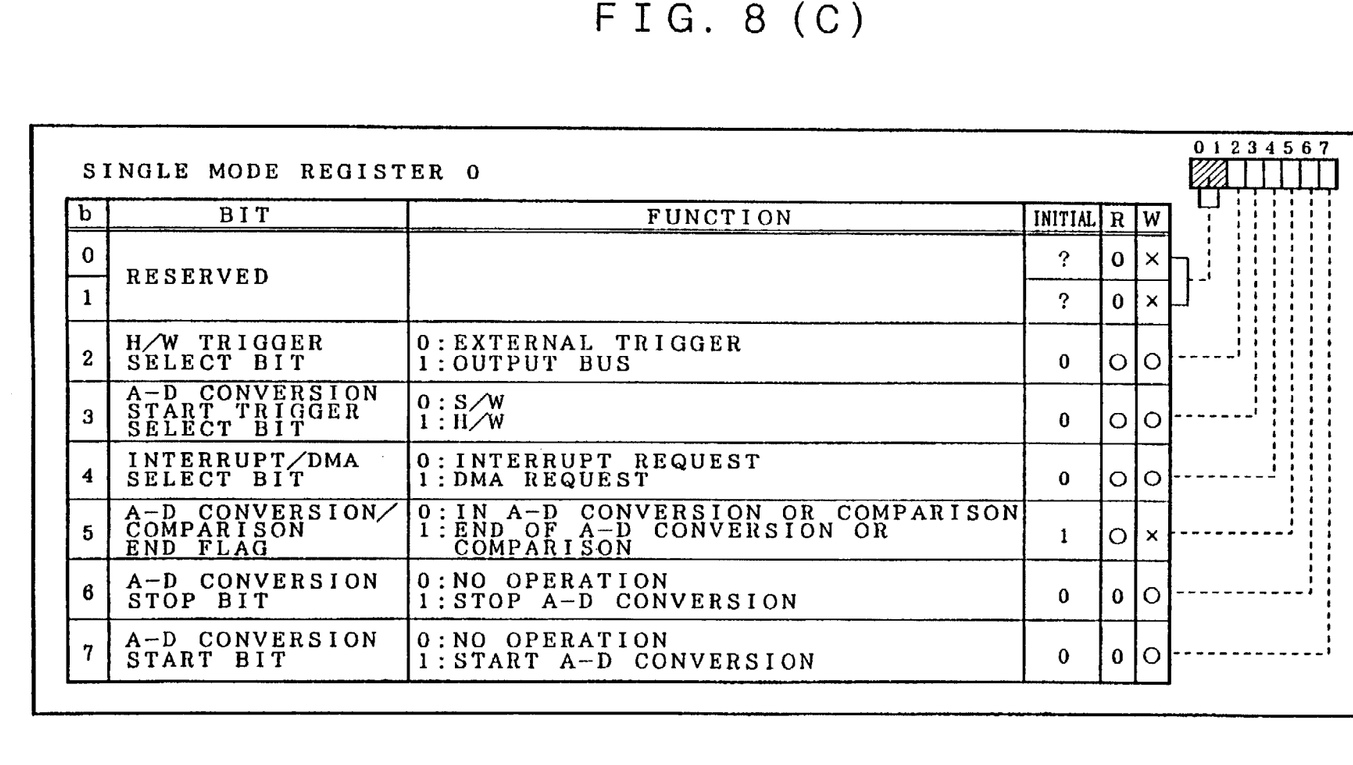
Figure 8D:
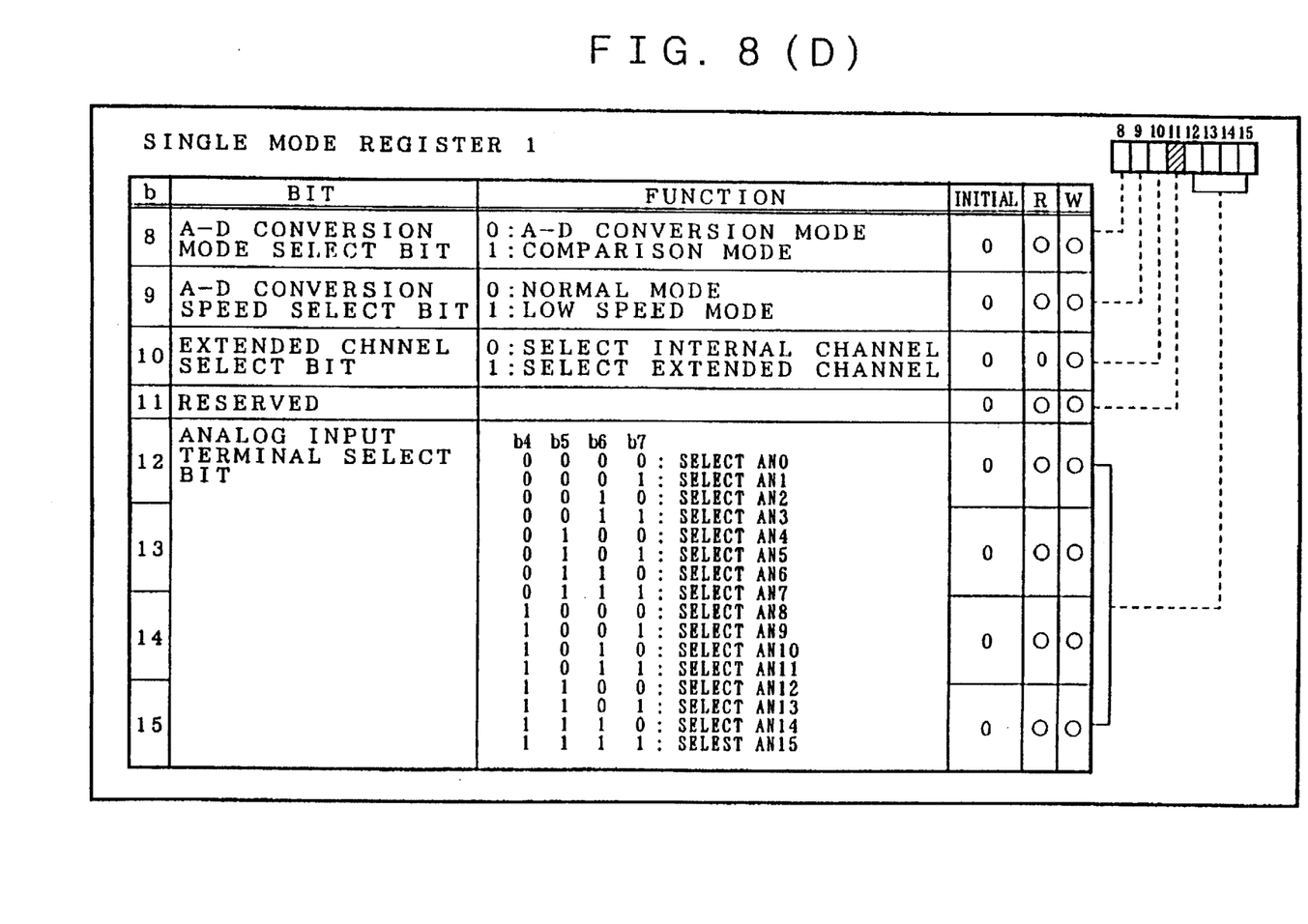

For example, let a conversion speed set to a normal mode in a single operation mode, and a conversion speed set to a double speed mode in a scan operation mode. When a scan mode conversion is started, a scan conversion in a double speed mode is started. When a starting trigger 7A for single conversion is input during the scan conversion, the scan in a double speed mode is interrupted, and operation conditions of various operation modes such as starting of the A-D conversion operation in a normal speed and a single operation mode can be set by using registers 4A and 4B.

As described above, according to the A-D conversion device of the embodiment 4, there is an effect in that the operation can be made as if the 2-system A-D conversion is provided, without consciousness at all of contents of one operation mode register, by carrying out the setting of the other operation mode.

Embodiment 5

In the A-D conversion device according to the above-described embodiment 1, the conversion operation between a scan mode and a single mode is determined in advance. For example, when the starting trigger 7A for single conversion in a single mode of a higher priority at the time of the conversion operation of the channel CH2 is input in a scan mode of a lower priority, the conversion operation in a scan mode is stopped to carry out the conversion operation of the channel CH5 in a single mode.

Figure 9:
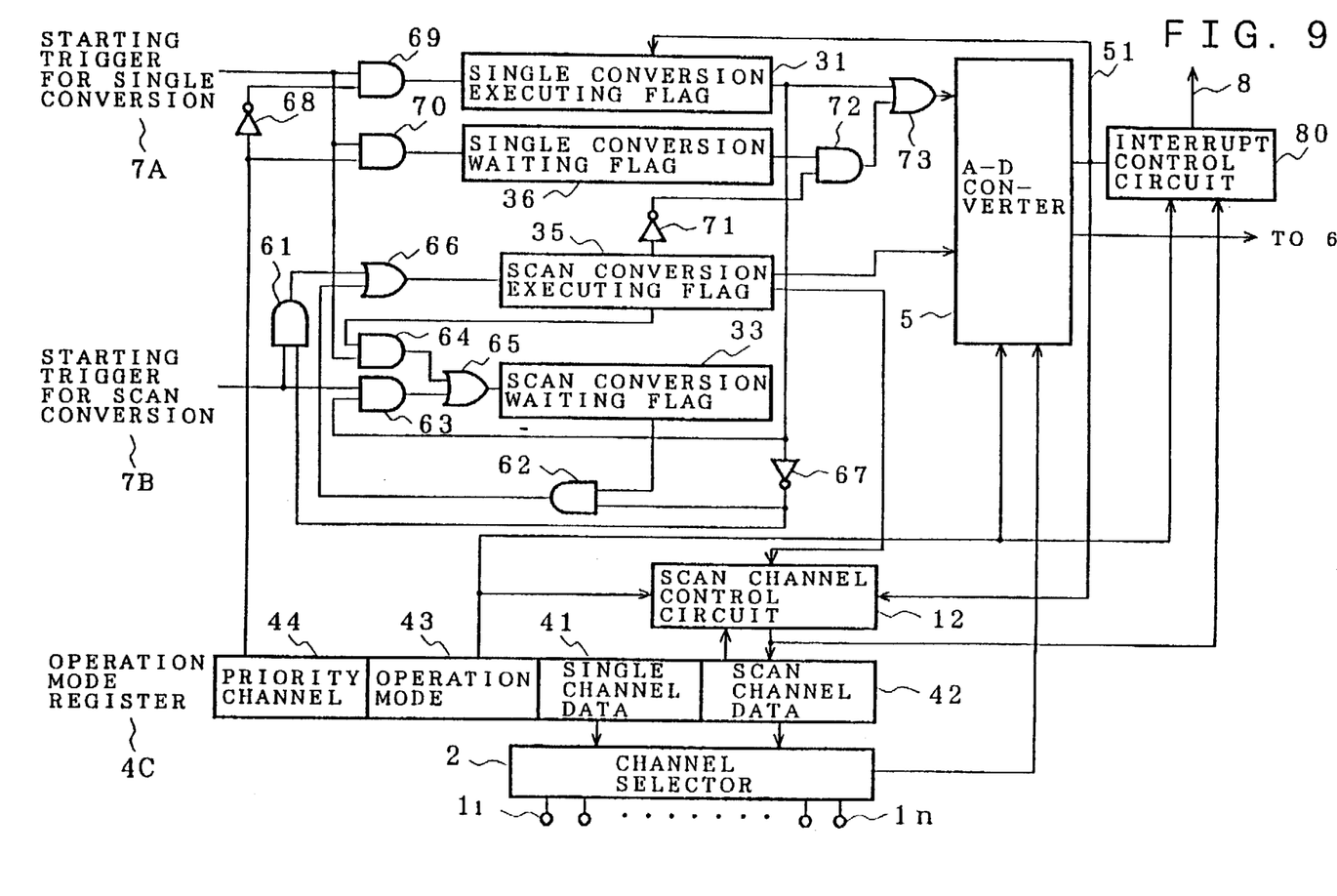
FIG. 9 is a block diagram of a control circuit in the A-D conversion device according to an embodiment 5.

In the A-D conversion device of the present embodiment 5, in addition to the embodiment of the A-D conversion device according to the embodiment 1 shown in FIGS. 1 and 2, there are further added a single conversion waiting flag 36, an inverter circuit 68, AND circuits (a second AND circuit) 69, and (a third AND circuit) 70, as shown in FIG. 9, and a priority channel 44 area is provided in an operation mode register 4 so that a priority order can be set every scan channel. The same parts as those shown in FIG. 2 are indicated by the same reference numerals, and a duplicated description will be omitted.

The operation will be described hereinafter.

When at the time of the conversion operation of channel CH2 under a scan mode, when the starting trigger 7A for single mode is input, the value of the priority channel 44 in the operation mode register 43 is "1", an output of the AND circuit 69 is "0" and the signal conversion executing flag 31 is not operated so that an output of the AND circuit 70 is "1" whereby the single mode conversion operation started by the value stored in the single waiting flag 36 is temporarily waited.

Figure 10:
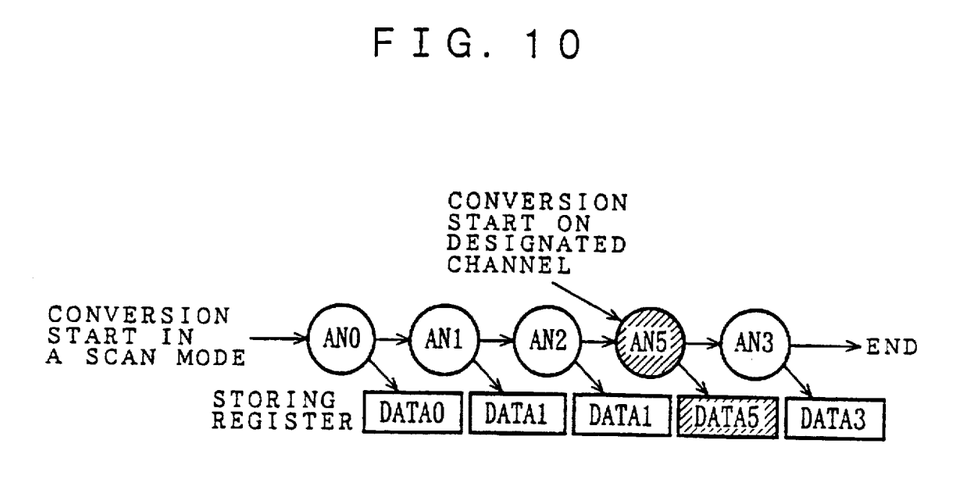
FIG. 10 shows a conversion state in the A-D conversion device according to an embodiment 5.

Then, as shown in FIG. 10, when after the end of the conversion operation in a scan mode of the channel CH2, the value of the priority channel 44 is "0", the value stored in the single conversion executing flag 31 is operated, after the output of the AND circuit 69 assumes "0" and the output value of the AND circuit 70 assumes "1", and the conversion operation of the channel CH5 in a single mode is started. That is, depending on the fact that the value of the priority channel 44 is "1" or "0", when the starting trigger for single mode is input at the time of the conversion operation in a scan mode, the execution of the conversion operation under either mode can be selected.

As described above, according to the A-D conversion in the present embodiment 5, there is an effect in that the determination of the priority order can be finely set, and software in accordance with an application can be developed. As described above in detail, the A-D conversion devices according to the teachings of this invention are employed in which either the A-D conversion operation in a single mode or the A-D conversion operation in a scan mode is preferentially operated with respect to the other. Therefore, there is obtained an effect in that in the case where the need of stating of the A-D conversion operation with a higher priority occurs in the midst of the execution of the A-D conversion operation with a lower priority, the A-D conversion operation with a higher priority can be executed immediately.

Further, the A-D conversion device according to the teachings of this invention are employed in which the operation of the scan executing flag for carrying out the A-D conversion upon receipt of the starting trigger for scan conversion of a lower priority is stopped by an operation signal of the single executing flag for carrying out the A-D conversion upon receipt of the starting trigger for single conversion of a higher priority. Therefore, there is obtained an effect in that the conversion operation of a higher priority can be carried out without intervention of CPU and by one output system for an interrupt signal in which a chip layout area is small, and the processing ability of CPU can be improved. Further, the A-D conversion device according to the teachings of this invention are employed in which when a conversion start signal of a lower priority is input during the conversion operation of a higher priority, the conversion operation of a lower priority is waited by the scan waiting flag. Therefore, there is obtained an effect in that the conversion operation of a lower priority can be started as the conversion operation of a higher priority ends, without consciousness of the operation state of the A-D conversion of a higher priority.

Furthermore, the A-D conversion device according to the teachings of this invention are employed in which there are two systems of interrupt factors. Therefore, there is obtained an effect in that the operation by interrupt factor can be executed efficiently.

Further, the A-D conversion device according to the teachings of this invention are employed in which a single operation mode register for setting an operation mode at the time of the single mode conversion and a scan register for setting an operation mode at the time of the scan mode conversion are separately provided. Therefore, there is obtained an effect in that the mode setting of the single mode and the scan mode can be made without consciousness at all of the contents of the other mode register.

Moreover, the A-D conversion device according to the teachings of this invention are employed in which the determination of priority order is made every channel. Therefore, there is an effect in that the priority order can be finely set.

What is claimed is:

1. An analog-to-digital conversion device comprising:

a plurality of analog signal input terminals;

a channel selector for selecting one of the plurality of analog signal input terminals;

an analog-to-digital converter for converting an analog signal selected and supplied by said channel selector into a digital signal; and control means for preferentially operating in at least one of (i) a scan mode in response to a starting trigger for scan conversion, and (ii) a single mode in response to a starting trigger for single conversion, said control means including:

a single conversion executing flag receiving a starting trigger for single conversion of a first priority, storing a value for executing a conversion operation, and producing an operation signal;

a scan conversion executing flag receiving a starting trigger for scan conversion of a second priority, storing a value for executing a scan mode conversion operation, and producing an operation signal; and operation selecting means storing a value in said scan conversion executing flag and for stopping a conversion operation in response to the operation signal from said single conversion executing flag.

2. The analog-to-digital conversion device according to claim 1, comprising:

a scan conversion waiting flag for, when a conversion operation starting signal of the second priority is input to said control means during a conversion operation of the first priority, storing instructions for temporarily delaying execution of the conversion operation of the second priority; and waiting control means for controlling input to and output from said scan conversion waiting flag.

3. The analog-to-digital conversion device according to claim 2, wherein said waiting control means comprises:

a pair of AND circuits connected in parallel; and an OR circuit for OR-ing outputs from said pair of AND circuits and outputting a result to the scan conversion waiting flag.

4. The analog-to-digital conversion device of claim 2, wherein the first priority is higher than the second priority.

5. The analog-to-digital conversion device of claim 2, wherein the second priority is higher than the first priority.

6. The analog-to-digital conversion device according to claim 1, comprising an interrupt control circuit connected to said control means to generate interrupt signals, individually and independently, on the basis of a control signal indicating an end of a conversion operation of the first priority and beginning of a conversion operation of the second priority, transmitted from said control means.

7. The analog-to-digital conversion device of claim 6, wherein the first priority is higher than the second priority.

8. The analog-to-digital conversion device of claim 6, wherein the second priority is higher than the first priority.

9. The analog-to-digital conversion device according to claim 1, comprising:

a single conversion waiting flag for storing a value for temporarily delaying execution of a single mode conversion operation and, wherein said control means includes an operation mode register having a priority channel area for storing a value for applying a priority order to every channel, whereby values stored in the single conversion executing flag and the single conversion waiting flag are controlled on the basis of values stored in the priority channel area.

10. The analog-to-digital conversion device according to claim 9, comprising:

an inverter circuit;

a first AND circuit coupled to said inverter circuit, said inverter circuit and said first AND circuit being connected between the priority channel area in said operation mode register and the single conversion executing flag; and a second AND circuit connected between the priority channel area and said single conversion waiting flag.

11. The analog-to-digital conversion device according to claim 1, wherein said control means includes a single operation mode register for setting an operation mode during single mode conversion; and a scan mode register for setting an operation mode during scan mode conversion.

12. The analog-to-digital conversion device according to claim 1, wherein said operation selection means comprises:

a first inverter circuit for receiving the operation signal from the single conversion executing flag and outputting a first control signal;

a first AND circuit for receiving a starting trigger for scan conversion and the first control signal and outputting a second control signal;

a second AND circuit for receiving an operating signal from said scan conversion waiting flag and the first control signal and producing a third control signal; and an OR circuit receiving the second and third control signals to OR the second and third control signals and transmit a fourth control signal to the scan conversion executing flag.

13. The analog-to-digital conversion device of claim 1, wherein the first priority is higher than the second priority.

14. The analog-to-digital conversion device of claim 1, wherein the second priority is higher than the first priority.

* * * * *